(12) United States Patent
Zhang et al.

(10) Patent No.: US 12,026,050 B2
(45) Date of Patent: Jul. 2, 2024

(54) DDR DIMM, MEMORY SYSTEM AND OPERATION METHOD THEREOF

(71) Applicant: INNOSILICON MICROELECTRONICS (WUHAN) CO., LTD., Wuhan (CN)

(72) Inventors: Liang Zhang, Wuhan (CN); Ming Huang, Wuhan (CN)

(73) Assignee: INNOSILICON MICROELECTRONICS (WUHAN) CO., LTD., Wuhan (CN)

( * ) Notice: Subject to any disclaimer, the term of this patent is extended or adjusted under 35 U.S.C. 154(b) by 0 days.

(21) Appl. No.: 17/994,324

(22) Filed: Nov. 27, 2022

(65) Prior Publication Data

US 2023/0367671 A1 Nov. 16, 2023

Related U.S. Application Data

(63) Continuation of application No. PCT/CN2022/117251, filed on Sep. 6, 2022.

(30) Foreign Application Priority Data

May 16, 2022 (CN) .......................... 202210526445.8

(51) Int. Cl.
*G06F 11/10* (2006.01)
(52) U.S. Cl.
CPC ........ *G06F 11/1044* (2013.01); *G06F 11/102* (2013.01)

(58) Field of Classification Search
CPC .......................... G06F 11/1044; G06F 11/102
See application file for complete search history.

(56) References Cited

U.S. PATENT DOCUMENTS

| | | | |
|---|---|---|---|
| 2004/0205433 A1 | 10/2004 | Gower et al. | |
| 2014/0013184 A1* | 1/2014 | Takahashi | G06F 11/1008 714/763 |
| 2017/0337144 A1* | 11/2017 | Ware | G06F 13/1678 |
| 2019/0325982 A1* | 10/2019 | Woo | G11C 29/4401 |

FOREIGN PATENT DOCUMENTS

| | | |
|---|---|---|
| CN | 101644995 A | 2/2010 |
| WO | 2018141174 A1 | 8/2018 |

* cited by examiner

*Primary Examiner* — Thien Nguyen (57) ABSTRACT

A double data rate dual-in-line memory module (DDR DIMM), a memory system and an operation method thereof using a data buffer for error correction are disclosed. In an example, the DDR DIMM includes a first channel including a first group of DRAM chips and a first data buffer corresponding to the first group of DRAM chips; wherein: the first data buffer is configured to obtain all write data signals input to the first channel, encode write data of all the write data signals to generate a first ECC, and send the first ECC and the write data to the first group of DRAM chips in a write operation. The disclosure can realize excellent error detection and error correction within the memory module and can greatly reduce bit error rate of the entire memory module.

20 Claims, 9 Drawing Sheets

DDR DIMM, MEMORY SYSTEM AND OPERATION METHOD THEREOF

RELATED APPLICATIONS

This application is a bypass continuation of International Application No. PCT/CN2022/117251, filed on Sep. 6, 2022, which claims priority to Chinese Patent Application No. 202210526445.8 filed on May 16, 2022. The disclosures of the prior applications are hereby incorporated by reference in their entirety.

TECHNIAL FIELD

This disclosure generally relates to the field of memory, and more particularly, to a double data rate dual-in-line memory module (DDR DIMM), a memory system and an operation method thereof using a data buffer for error correction.

BACKGROUND

DDR is the abbreviation of DDR SDRAM. The current standard of double data rate synchronous dynamic random access memory (DDR SDRAM) provides a channel for DIMM devices. With the decrease of feature size, and the increase of operation rate and storage capacity, data error may exist for a long period in memory chips. It is very important for stability requirement to do real-time error correction automatically by error correction code technology even in the case of multiple errors in a memory chip, so as to ensure normal operation of the system.

At hardware level, methods of realizing Error Correcting Code (ECC) in memory systems mainly include: (1) error correction by memory chips. For example, fifth generation of DDR SDRAM (DDR5) has 1-bit error correction code. However, its error correction capability is relatively weak, for errors are very likely to occur in more than one bit in practice. (2) error correction by the memory controller (MC). Since the memory controller is usually located on chip of the main processor (CPU/Host) which is updated on a relatively low rate, so it is rather difficult for most manufacturers of universal CPU to incorporate high-performance error correction function, or error correction codes and mapping structures particularly effective for certain DRAM chips in the memory controller, and error correction capability of the memory controller can hardly meet the actual needs.

SUMMARY

In view of the above defects or improvement requirements of the prior art, the present disclosure provides a DDR DIMM, a memory system and an operation method thereof using a data buffer for error correction, which can realize excellent error detection and error correction within the memory module and can greatly reduce bit error rate of the entire memory module.

In order to achieve the above object, according to an aspect of the disclosure, a DDR DIMM is provided. The DDR DIMM includes a first channel including a first group of DRAM chips and a first data buffer corresponding to the first group of DRAM chips; wherein: the first data buffer is configured to obtain all write data signals input to the first channel, encode write data of all the write data signals to generate a first ECC, and send the first ECC and the write data to the first group of DRAM chips in a write operation.

In some embodiments, the first data buffer is further configured to obtain all read data signals of the first channel from the first group of DRAM chips, check whether there is an error bit in read data of all the read data signals, and correct the read data and send out the corrected read data when there is an error bit therein in a read operation.

In some embodiments, the DDR DIMM further includes a circuit board; wherein: the first channel further includes a second group of DRAM chips; the first group of DRAM chips are located on a first side of the circuit board, and the second group of DRAM chips are located on a second side of the circuit board opposite to the first side; the first data buffer corresponds to the second group of DRAM chips; and the first group of DRAM chips and the second group of DRAM chips cannot work simultaneously.

In some embodiments, the first data buffer is further configured to send the first ECC and the write data to the second group of DRAM chips in a write operation; and obtain all read data signals of the first channel from the second group of DRAM chips, check whether there is an error bit in read data of all the read data signals, and correct the read data and send out the corrected read data when there is an error bit therein in a read operation.

In some embodiments, the first data buffer includes a first transceiver, a second transceiver, an ECC encoder and an ECC decoder; the ECC encoder and the ECC decoder connect the first transceiver and the second transceiver respectively; and the second transceiver connects the first group of DRAM chips.

In some embodiments, in the write operation, the first transceiver is configured to receive all the write data signals input to the first channel triggered by a clock signal, the ECC encoder is configured to encode the write data of all the write data signals to generate the first ECC, and the second transceiver is configured to send the first ECC and the write data to the first group of DRAM chips.

In some embodiments, in a read operation, the second transceiver is configured to obtain all read data signals of the first channel from the first group of DRAM chips triggered by a clock signal, the ECC decoder is configured to check whether there is an error bit in read data of all the read data signals, and correct the read data and output the corrected read data when there is an error bit therein, or output the read data when there is no error bit therein, and the first transceiver is configured to send out the corrected read data or the read data output by the ECC decoder.

In some embodiments, the first transceiver includes a plurality of first receiving modules; and the plurality of first receiving modules are configured to obtain all the write data signals input to the first channel in the write operation.

In some embodiments, the first receiving module includes a first receiver, a second receiver and a first D flip-flop; the first receiver is configured to receive a write data signal input to the first channel and output the write data signal to a data-input terminal of the first D flip-flop; the second receiver is configured to receive a write sampling clock and output the write sampling clock to a clock-input terminal of the first D flip-flop; and the first D flip-flop is configured to output the write data signal input to the first channel at a rising edge of the write sampling clock through a positive output terminal thereof.

In some embodiments, the second transceiver includes a plurality of second receiving modules; and the plurality of second receiving modules are configured to obtain all read data signals of the first channel from the first group of DRAM chips and output all the read data signals in a read operation.

In some embodiments, the second receiving module includes a third receiver, a fourth receiver and a second D flip-flop; the third receiver is configured to receive a read data signal from the first group of DRAM chips and output the read data signal to a data-input terminal of the second D flip-flop; the fourth receiver is configured to receive a read sampling clock and output the read sampling clock to a clock-input terminal of the second D flip-flop; and the second D flip-flop is configured to output the read data signal from the first group of DRAM chips at a rising edge of the read sampling clock through a positive output terminal thereof.

In some embodiments, the first data buffer includes a first transceiver, a second transceiver, an ECC encoder, an ECC decoder, a first selector and a second selector; the ECC encoder connects the first selector and the first transceiver; the ECC decoder connects the second selector and the second transceiver; the first selector connects the first transceiver and the second transceiver; the second selector connects the first transceiver and the second transceiver; and the second transceiver connects the first group of DRAM chips.

In some embodiments, the first transceiver is configured to receive and output all the write data signals input to the first channel triggered by a clock signal, and the ECC encoder is configured to encode the write data of all the write data signals to generate the first ECC and output the first ECC and the write data.

In some embodiments, the first selector is configured to enable or disable an ECC function in the write operation, and send an output of the ECC encoder to the first group of DRAM chips through the second transceiver when the ECC function is enabled, or send an output of the first transceiver to the first group of DRAM chips through the second transceiver when the ECC function is disabled.

In some embodiments, in the read operation, the second transceiver is configured to obtain and output all read data signals of the first channel from the first group of DRAM chips triggered by a clock signal, and the ECC decoder is configured to check whether there is an error bit in read data of all the read data signals, and correct the read data and output the corrected read data when there is an error bit therein, or output the read data when there is no error bit therein.

In some embodiments, the second selector is configured to enable or disable an ECC function in the read operation, and send out an output of the ECC decoder through the first transceiver when the ECC function is enabled, or send out an output of the second transceiver through the first transceiver when the ECC function is disabled.

In some embodiments, the first transceiver further includes a first transmitting module configured to send out an output of the ECC decoder or the second transceiver in the read operation.

In some embodiments, the second transceiver further includes a second transmitting module configured to send out an output of the ECC encoder or the first transceiver in the write operation.

According to another aspect of the disclosure, a memory system is provided. The memory system includes a CPU and the foregoing DDR DIMM; wherein the CPU is configured to perform read and write operation on the DDR DIMM.

According to another aspect of the disclosure, a memory system is provided. The memory system includes a CPU; and a DDR DIMM including a first channel; wherein: the first channel includes a first group of DRAM chips and a first data buffer corresponding to the first group of DRAM chips; the first data buffer is configured to send write data of all write data signals sent to the first channel by the CPU to the first group of DRAM chips in a first write operation, and obtain all read data signals of the first channel from the first group of DRAM chips in a first read operation; and the first data buffer is further operable for error correction in the first write operation and the first read operation.

In some embodiments, the first data buffer is configured to obtain all the write data signals sent to the first channel by the CPU, encode the write data of all the write data signals to generate a first ECC, and send the first ECC and the write data to the first group of DRAM chips in the first write operation.

In some embodiments, the first data buffer is further configured to obtain all read data signals of the first channel from the first group of DRAM chips, check whether there is an error bit in read data of all the read data signals, and correct the read data and send the corrected read data to the CPU when there is an error bit therein in the first read operation.

In some embodiments, the memory system further includes a circuit board; wherein: the first channel further includes a second group of DRAM chips; the first group of DRAM chips are located on a first side of the circuit board, and the second group of DRAM chips are located on a second side of the circuit board opposite to the first side; the first data buffer corresponds to the second group of DRAM chips; and the first group of DRAM chips and the second group of DRAM chips cannot work simultaneously.

In some embodiments, the first data buffer is further configured to obtain all the write data signals sent to the first channel by the CPU, encode the write data of all the write data signals to generate a first ECC, send the first ECC and the write data to the second group of DRAM chips in the first write operation; and the first data buffer is further configured to obtain all read data signals of the first channel from the second group of DRAM chips, check whether there is an error bit in read data of all the read data signals, and correct the read data and send the corrected read data to the CPU when there is an error bit therein in the first read operation.

In some embodiments, the memory system further includes a second channel including a third group of DRAM chips and a second data buffer corresponding to the third group of DRAM chips; wherein: the second data buffer is configured to send write data of all write data signals sent to the second channel by the CPU to the third group of DRAM chips in a second write operation, and obtain all read data signals of the second channel from the third group of DRAM chips in a second read operation; and the second data buffer is further operable for error correction in the second write operation and the second read operation.

In some embodiments, the second data buffer is configured to obtain all the write data signals sent to the second channel by the CPU, encode the write data of all the write data signals of the second channel to generate a second ECC, and send the second ECC and the write data of all the write data signals of the second channel to the third group of DRAM chips in the second write operation; and the second data buffer is further configured to obtain all the read data signals of the second channel from the third group of DRAM chips, check whether there is an error bit in read data of all the read data signals of the second channel, and correct the read data and send the corrected read data to the CPU when there is an error bit therein in the second read operation.

In some embodiments, the second channel further includes a fourth group of DRAM chips; the third group of DRAM chips are located on the first side of the circuit board, and the fourth group of DRAM chips are located on the second side of the circuit board; the second data buffer corresponds to the fourth group of DRAM chips; and the third group of DRAM chips and the fourth group of DRAM chips cannot work simultaneously.

In some embodiments, the second data buffer is configured to obtain all the write data signals sent to the second channel by the CPU, encode the write data of all the write data signals to generate a second ECC, and send the second ECC and the write data to the fourth group of DRAM chips in a second write operation.

In some embodiments, the second data buffer is further configured to obtain all read data signals of the second channel from the fourth group of DRAM chips, check whether there is an error bit in read data of all the read data signals of the second channel, and correct the read data and send the corrected read data to the CPU when there is an error bit therein in a second read operation.

In some embodiments, the first data buffer includes a first transceiver, a second transceiver, an ECC encoder and an ECC decoder.

In some embodiments, the ECC encoder and the ECC decoder connect the first transceiver and the second transceiver respectively; and the second transceiver connects the first group of DRAM chips.

In some embodiments, the first data buffer further includes a first selector and a second selector.

In some embodiments, the ECC encoder connects the first selector and the first transceiver; the ECC decoder connects the second selector and the second transceiver; the first selector connects the first transceiver and the second transceiver; the second selector connects the first transceiver and the second transceiver; and the second transceiver connects the first group of DRAM chips.

In some embodiments, structure of the second data buffer is the same as that of the first data buffer.

According to another aspect of the disclosure, a method of operating a DDR DIMM is provided. The method includes obtaining all write data signals of a channel from an external device; encoding write data of all the write data signals obtained from the external device to generate an ECC; and sending the ECC and the write data of all the write data signals to DRAM chips of the channel.

In some embodiments, the steps of encoding write data of all the write data signals obtained from the external device to generate an ECC and send the ECC and the write data of all the write data signals to DRAM chips of the channel are performed when an ECC function is enabled.

In some embodiments, all the write data signals obtained from the external device are sent to DRAM chips of the channel instead of performing the steps of encoding write data of all the write data signals obtained from the external device to generate an ECC and send the ECC and the write data of all the write data signals to DRAM chips of the channel when an ECC function is disabled.

In some embodiments, the method further includes obtaining all read data signals of the channel from the DRAM chips; checking whether there is an error bit in read data of all the read data signals obtained from the DRAM chips; and correcting the read data and send out the corrected read data when there is an error bit therein.

In some embodiments, the steps of checking whether there is an error bit in read data of all the read data signals obtained from the DRAM chips; and correcting the read data and send out the corrected read data when there is an error bit therein are performed when an ECC function is enabled.

In some embodiments, the method further includes storing error information when there is an error bit therein.

In some embodiments, all the read data signals obtained from the DRAM chips are output instead of performing the steps of checking whether there is an error bit in read data of all the read data signals obtained from the DRAM chips and correcting the read data and send out the corrected read data when there is an error bit therein when an ECC function is disabled.

According to another aspect of the disclosure, a method of operating a DDR DIMM is provided. The method includes performing a write operation by obtaining all write data signals sent to a channel and sending write data of all the write data signals to DRAM chips; performing a read operation by obtaining all read data signals of the channel from the DRAM chips and output read data of all the read data signals; and performing error correction during the write operation and the read operation.

In some embodiments, the write data of all the write data signals is encoded to generate an ECC, and the ECC and the write data of all the write data signals are sent to the DRAM chips in the write operation.

In some embodiments, a step of checking whether there is an error bit in the read data of all the read data signals obtained from the DRAM chips is performed, and the read data is corrected and the corrected read data is output when there is an error bit therein in the read operation.

In general, compared with the prior art, the above technical solutions of the present disclosure have the following beneficials: integrating all data buffers (DB) of a channel, so that one channel has one data buffer which has an error correction function, that is, to encode data from a CPU, perform error detection on data from memory chips, and realize error correction and error reporting automatically. Since an integrated data buffer can obtain all the data of a channel where it is located, excellent error detection and error correction can be realized in a memory module, which greatly reduces bit error rate of the entire memory module.

DETAILED DESCRIPTION

In order to make the objectives, technical solutions and advantages of the disclosure clearer, the disclosure will be further described in details below with reference to the accompanying drawings and embodiments. It should be understood that the specific embodiments described herein are only for explaining the disclosure, but not to limit the disclosure. As those skilled in the art would realize, the described embodiments may be modified in various different ways, all without departing from the spirit or scope of the disclosure. Accordingly, the drawings and descriptions are to be regarded as illustrative in nature and not restrictive.

Figure 1:
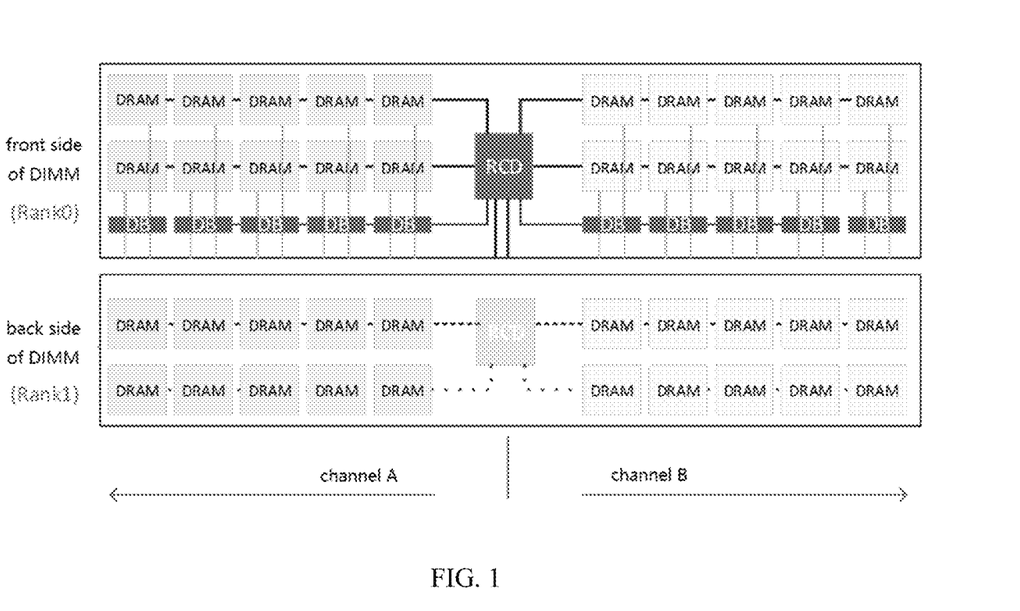
FIG. 1 is a schematic diagram of the layout and wiring of a DDR5 Load Reduced DIMM (LRDIMM).

FIG. 1 is a schematic diagram of the layout and wiring of a DDR5 LRDIMM. As shown in FIG. 1, there are memory chips on both sides of the memory module (e.g., both sides of a printed circuit board or a PCB board) which has two ranks, with one rank on each side. The rank on a front side (also referred to a first side) is Rank0 (also referred to a first rank) and the rank on a back side (also referred to a second side) is Rank1 (also referred to a second rank). Channel A (also referred to a first channel) and channel B (also referred to a second channel) respectively have 10×4 DRAM chips (also referred to a first group of DRAM chips and a third group of DRAM chips) on the front side, 10×4 DRAM chips (also referred to a second group of DRAM chips and a fourth group of DRAM chips) on the back side, and 5 data buffers (DB). The data buffers, along with a registering clock driver (RCD), are located on the front side (the RCD of Rank 1 in FIG. 1 is just for illustration of connection relationship). The RCD connects memory chips on both sides by command/address lines and each DB connects its corresponding memory chips on both sides by data lines (data line connection of Rank 1 is not shown in FIG. 1), that is, each DB has one side connecting two memory chips on the front side and two memory chips on the back side, and another side connecting gold fingers on an edge of the memory module which further connect DDR data lines of a CPU through a mainboard. Rank0 and Rank1 do not work at the same time. At a certain moment, either Rank0 or Rank1 works, or both Rank0 and Rank1 do not work. Each DB is only responsible for one-fifth of the data of its channel.

Figure 2:
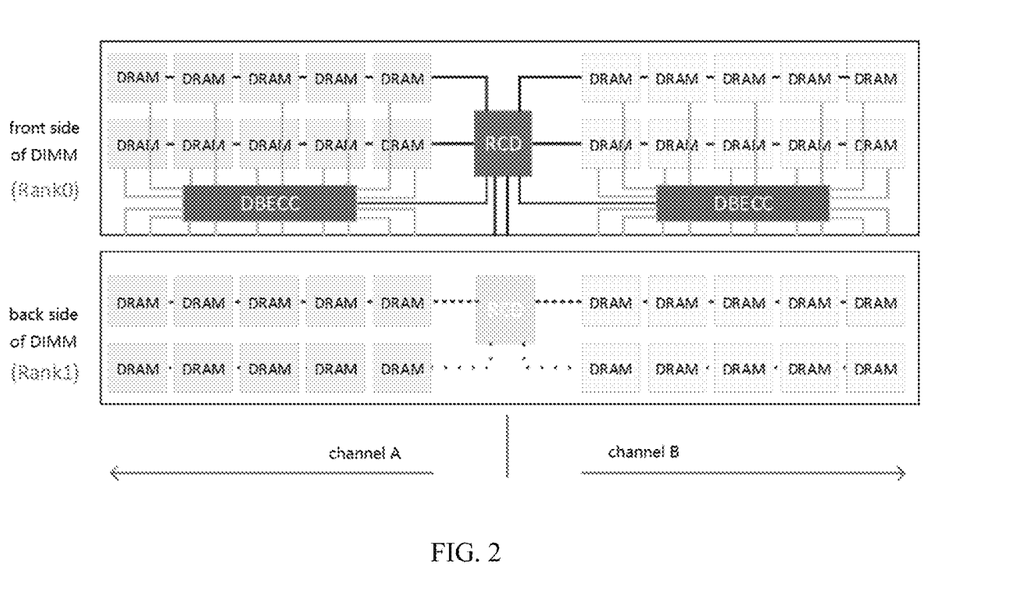
FIG. 2 is a schematic diagram of the layout and wiring of a DDR5 DIMM using a data buffer for error correction, according to an embodiment of the disclosure.

FIG. 2 is a schematic diagram of the layout and wiring of a DDR5 DIMM using a data buffer for error correction, according to an embodiment of the disclosure. As shown in FIG. 2, compared with the structure in FIG. 1, the 5 data buffers of channel A and channel B are integrated respectively with a new function of error correction, so that a data buffer with error correction capability (hereinafter marked as DBECC) is formed. That is, channel A has a DBECC (also referred to a first data buffer) responsible for processing all data signals of a read operation (from DRAM to CPU) and a write operation (from CPU to DRAM) of channel A, and implementing ECC encoding and decoding, and error correction and reporting automatically. Channel B works in a similar way. That is, channel B has a DBECC (also referred to a second data buffer) responsible for processing all data signals of a read operation (from DRAM to CPU) and a write operation (from CPU to DRAM) of channel B, and implementing ECC encoding and decoding, and error correction and reporting automatically. A DBECC has one side connecting memory chips of a channel where it is located, and another side connecting gold fingers on an edge of the memory module which further connect DDR data lines of a CPU through a mainboard.

Memory chips of channel A can have the same layout as memory chips of channel B. Take channel A for example, Rank0 has 10×4 DRAM chips which are arranged in two rows, with 5×4 DRAM chips in each row. Rank1 also has 10×4 DRAM chips which are arranged in two rows, with 5×4 DRAM chips in each row. The two DBECCs, along with an RCD, are located on a front side of the memory module (the RCD of Rank 1 in FIG. 2 is just for illustration of connection relationship), wherein the RCD is located between memory chips of channel A and channel B. DBECCs of channel A and channel B are respectively located in a third row behind the two rows of memory chips of Rank0.

It should be understood that width and height of the DRAM chips and the DBECCs in FIG. 2 is just for illustration. Width and height of the DRAM chips can be customized in terms of actual storage capacity and manufacturing process, and width and height of the DBECCs can also be optimized according to layout of the DRAM chips of the memory module, which is not limited in the present disclosure.

Figure 3:
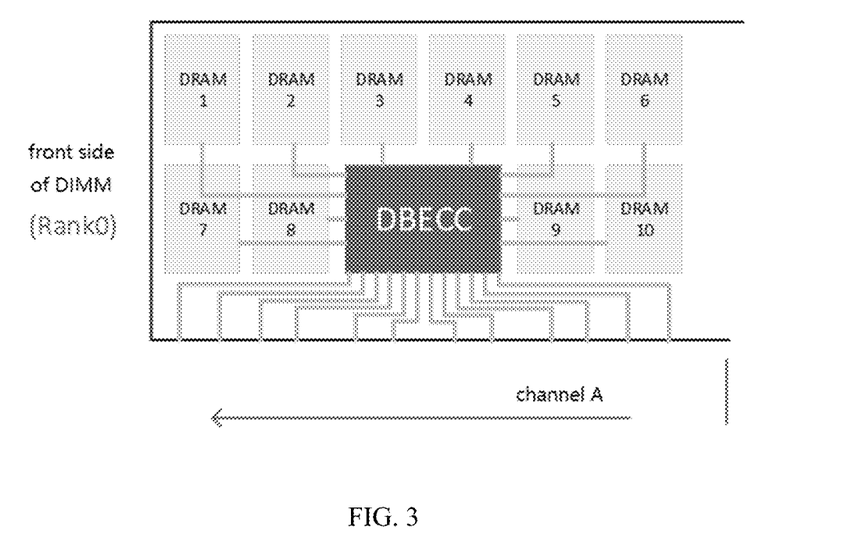
FIG. 3 is a schematic diagram of the layout and wiring of a DDR5 DIMM using a data buffer for error correction, according to another embodiment of the disclosure.

FIG. 3 is a schematic diagram of the layout and wiring of a DDR5 DIMM using a data buffer for error correction, according to another embodiment of the disclosure. As shown in FIG. 3, compared with the structure in FIG. 2, location of the DBECC is different and arrangement of the memory chips is adjusted accordingly. Specifically, take channel A for example, the 10×4 DRAM chips of Rank0 lie in two rows including a first row and a second row with different numbers of memory chips, wherein the DBECC is arranged in the second row which has fewer memory chips than the first row, that is, the DBECC lies between the memory chips in the second row. In some embodiments, the DBECC is closest to the middle of the memory chips in the second row. For example, in FIG. 3, there are 6 memory chips in the first row and 4 memory chips in the second row, and the DBECC lies in the middle of the 4 memory chips in the second row with two memory chips on each side respectively. For another example, there are 7 memory chips in the first row and 3 memory chips in the second row, and the DBECC is located closest to the middle of the 3 memory chips in the second row with 2 memory chips on one side and 1 memory chip on the other side. Layout of memory chips of Rank1 of channel A is the same as that of Rank0 of channel A, and layout of memory chips and DBECC of channel B is the same as that of channel A.

Figure 4:
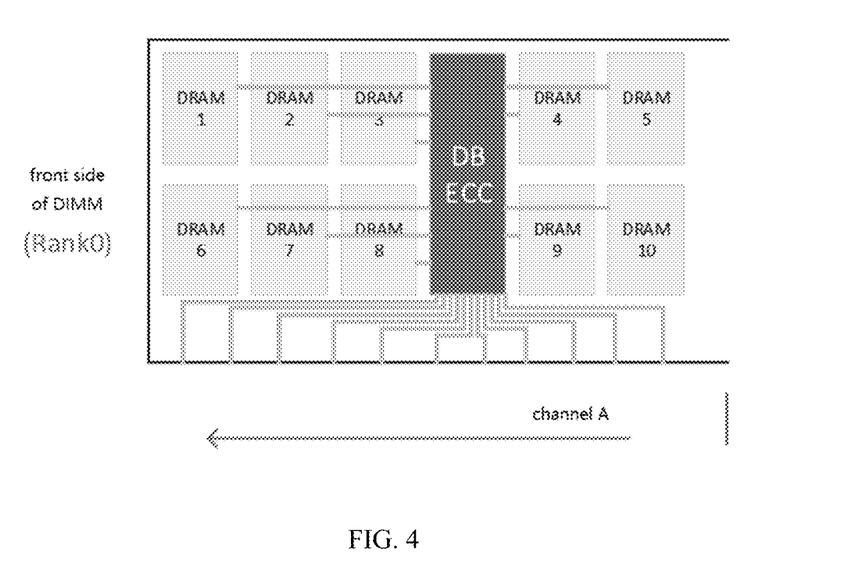
FIG. 4 is a schematic diagram of the layout and wiring of a DDR5 DIMM using a data buffer for error correction, according to another embodiment of the disclosure.

FIG. 4 is a schematic diagram of the layout and wiring of a DDR5 DIMM using a data buffer for error correction, according to another embodiment of the disclosure. As shown in FIG. 4, compared with the structure in FIG. 2, location of the DBECC is different and the arrangement of the memory chips is adjusted accordingly. Specifically, take channel A for example, the 10×4 DRAM chips of Rank0 lie in two rows including a first row and a second row with 5×4

DRAM chips respectively. The DBECC is set across the first row and the second row and between not only the memory chips in the first row but also the memory chips in the second row. In some embodiments, the DBECC is located closest to the middle of the memory chips in the first row and the memory chips in the second row. For example, there are 3 memory chips respectively in the first row and the second row on one side of the DBECC and 2 memory chips respectively in the first row and the second row on another side of the DBECC. Layout of memory chips of Rank1 of channel A is the same as that of Rank0 of channel A, and layout of memory chips and DBECC of channel B is the same as that of channel A.

In the embodiments shown in FIGS. 2-4, both Rank0 and Rank1 of a single channel have an even number of memory chips. When Rank0 or Rank1 works, the DBECC provide a 40-bit data signal to the 10×4 DRAM chips, which includes 32-bit data and 8-bit ECC. It should be understood that both Rank0 and Rank1 of a single channel can have an odd number of memory chips according to other embodiments of the disclosure, which is not limited in the present disclosure.

Figure 5:
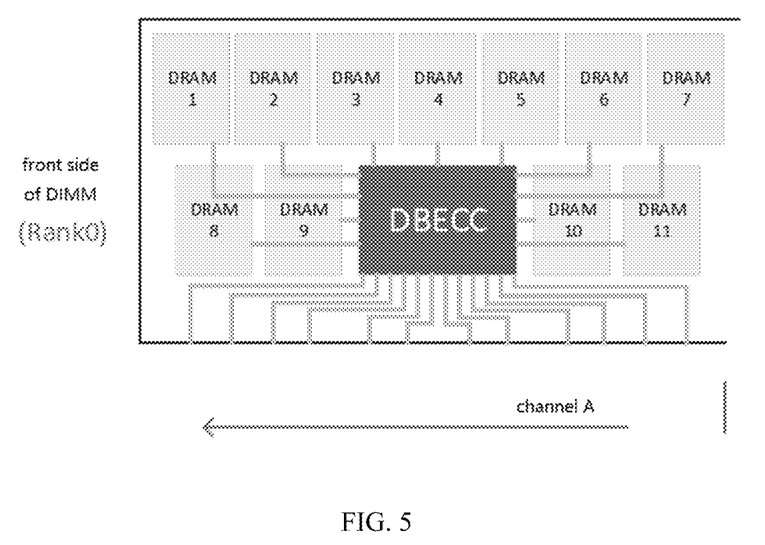
FIG. 5 is a schematic diagram of the layout and wiring of a DDR5 DIMM using a data buffer for error correction, according to another embodiment of the disclosure.

As shown in FIG. 5, Rank0 of channel A has 11×4 DRAM chips which lie in two rows including a first row and a second row with different numbers of memory chips. A DBECC is arranged in the second row which has fewer memory chips than the first row, that is, the DBECC lies between memory chips in the second row. In some embodiments, the DBECC is located closest to the middle of the memory chips in the second row. For example, there are 7 memory chips in the first row and 4 memory chips in the second row, and the DBECC lies in the middle of the 4 memory chips in the second row with two memory chips on each side respectively. Layout of memory chips of Rank1 of channel A is the same as that of Rank0 of channel A, and layout of memory chips and DBECC of channel B is the same as that of channel A.

Specifically, the DBECC provides a 44-bit data signal to the 11×4 DRAM chips, which includes 32-bit data and 12-bit ECC.

It can be understood that an ECC with more bits has stronger error correction capability, therefore more bits of ECC can be generated in order to correct more error bits, which requires more ×4 DRAM chips correspondingly. For example, a DBECC can provide a 48-bit data signal to 12×4 DRAM chips, which includes 32-bit data and 16-bit ECC.

In the embodiments shown in FIGS. 2-5, all the memory chips are ×4 DRAM chips. It should be understood that memory chips of a DDR DIMM could also be ×8 DRAM chips according to other embodiments of the disclosure.

Figure 6A:
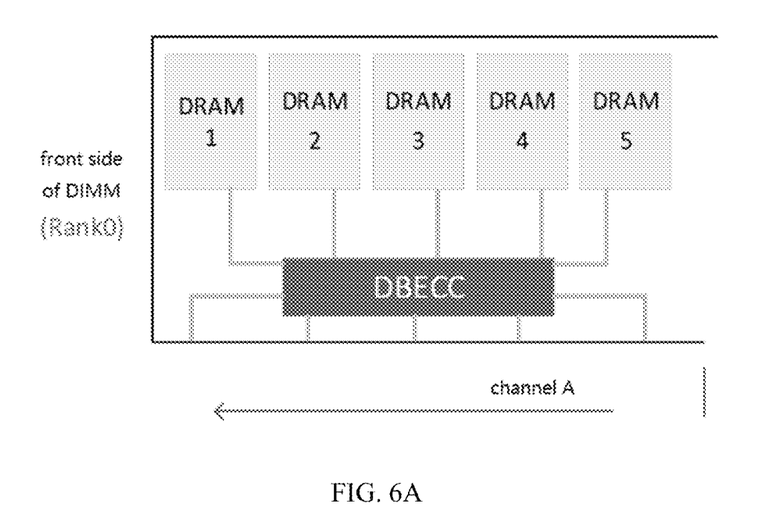
FIG. 6A and FIG. 6B are schematic diagrams of the layout and wiring of a DDR5 DIMM using a data buffer for error correction, according to another embodiment of the disclosure.

As shown in FIG. 6A, Rank0 of channel A has 5×8 DRAM chips which lie in a first row, and a DBECC lie in a second row behind the first row. Layout of memory chips of Rank1 of channel A is the same as that of Rank0 of channel A, and layout of memory chips and DBECC of channel B is the same as that of channel A. The DBECC provides a 40-bit data signal to the 5×8 DRAM chips, which includes 32-bit data and 8-bit ECC.

Figure 6B:
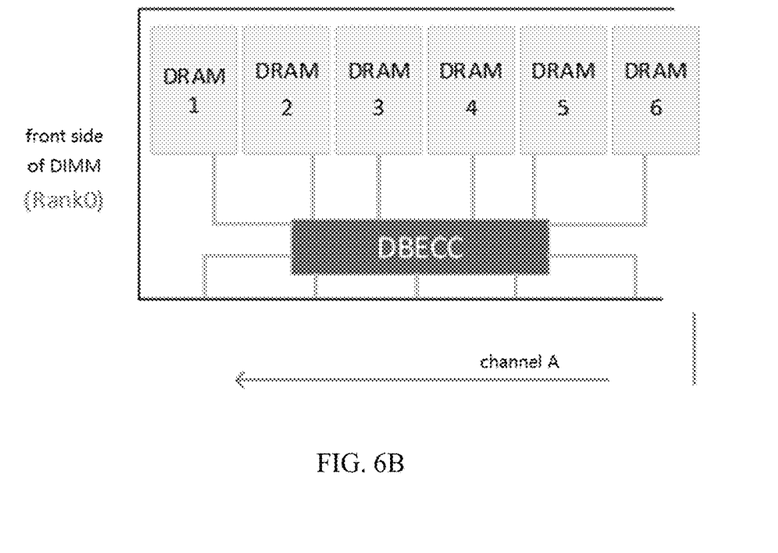

FIG. 6B shows Rank0 of channel A with 6×8 DRAM chips. The DBECC provides a 48-bit data signal to the 6×8 DRAM chips, which includes 32-bit data and 16-bit ECC.

Similarly, an ECC with more bits has stronger error correction capability, so more bits of ECC can be generated in order to correct more error bits, which requires more ×8 DRAM chips correspondingly. For example, a DBECC can provide a 56-bit data signal to 7×8 DRAM chips, which includes 32-bit data and 24-bit ECC.

In the embodiments shown in FIGS. 2-6, each memory module includes two ranks which are Rank0 and Rank1. In FIGS. 2, 6A and 6B, the first rank has multiple rows, the first group of DRAM chips lie in the first row, and the DBECC lies in the second row different from the first row. In FIGS. 3-5, the first rank has multiple rows, the first group of DRAM chips lie in the multiple rows, and the DBECC lies in one or more rows of the multiple rows. For example, in FIGS. 3 and 5, the DBECC lies in one row of the multiple rows, and in FIG. 4, the DBECC lies in both two rows of the multiple rows.

Figure 7:
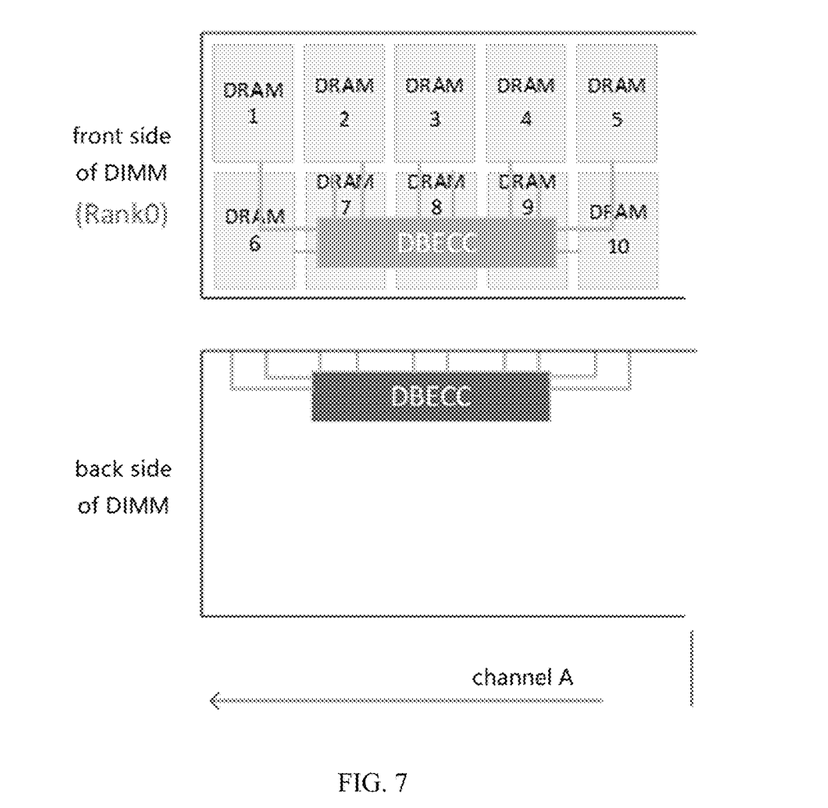
FIG. 7 is a schematic diagram of the layout and wiring of a DDR5 DIMM using a data buffer for error correction, according to another embodiment of the disclosure.

It should be understood that a DDR DIMM can also have only one rank, according to one embodiment of the disclosure. As shown in FIG. 7, a DDR DIMM has DRAM chips merely on a front side, so it has only one rank which is Rank0. Rank0 of channel A has 10×4 DRAM chips and a DBECC is set on a back side (the DBECC on the front side is just for illustration of connection relationship). Layout of memory chips and DBECC of channel B is the same as that of channel A. The DBECC provides a 40-bit data signal to 10×4 DRAM chips, which includes 32-bit data and 8-bit ECC.

The above examples are just for illustration of layout and wiring of memory modules including a DBECC, which can be optimized in terms of width and height of DRAM chips and number of ranks, which are not limited in the present disclosure.

Figure 8:
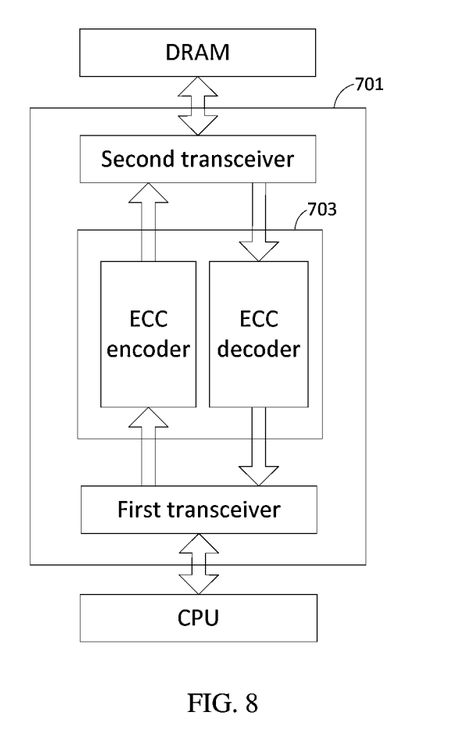
FIG. 8 is a schematic block diagram of a read operation and a write operation of a DDR DIMM, according to an embodiment of the disclosure.

FIG. 8 is a schematic block diagram of a read operation and a write operation of a DDR DIMM, according to an embodiment of the disclosure. As shown in FIG. 8, DBECC 701 connects a CPU and DRAM chips respectively. In a write operation (also referred to a first write operation corresponding to a first channel, or a second write operation corresponding to a second channel), DBECC 701 receives all write data signals of a channel where it is located from the CPU, encodes write data of all the write data signals to generate a new ECC (also referred to a first ECC corresponding to a first channel, or a second ECC corresponding to a second channel), and send the new ECC to the DRAM chips along with the write data. In a read operation (also referred to a first read operation corresponding to a first channel, or a second read operation corresponding to a second channel), DBECC 701 receives all read data signals (also referred to integral read data signal) of the channel from the DRAM chips including read data and an ECC, detects whether there is an error bit in the read data of all the read data signals, and sends the read data to the CPU when no error bit exists therein or corrects the read data automatically and sends the corrected read data to the CPU when an error bit exists therein.

Specifically, as shown in FIG. 8, DBECC 701 includes a first transceiver, a second transceiver and ECC module 703. ECC module 703 further includes an ECC encoder and an ECC decoder. In the write operation, the first transceiver receives all the write data signals of the channel from the CPU at a rising edge of a system clock, the ECC encoder encodes the write data of all the write data signals to generate the new ECC and send the new ECC to the DRAM chips along with the write data through the second transceiver. In the read operation, the second transceiver receives all the read data signals of the channel from the DRAM chips including the read data and the ECC at a rising edge of a system clock, and the ECC decoder detects whether there is an error bit in the read data of all the read data signals and sends the read data to the CPU through the first transceiver when no error bit exists therein or corrects the read data automatically and sends the corrected read data to the CPU through the first transceiver when an error bit exists therein.

In some embodiments, the ECC decoder stores error information in a local register for the CPU to read out and process afterwards after correcting the data automatically when an error bit exists therein.

Figure 9:
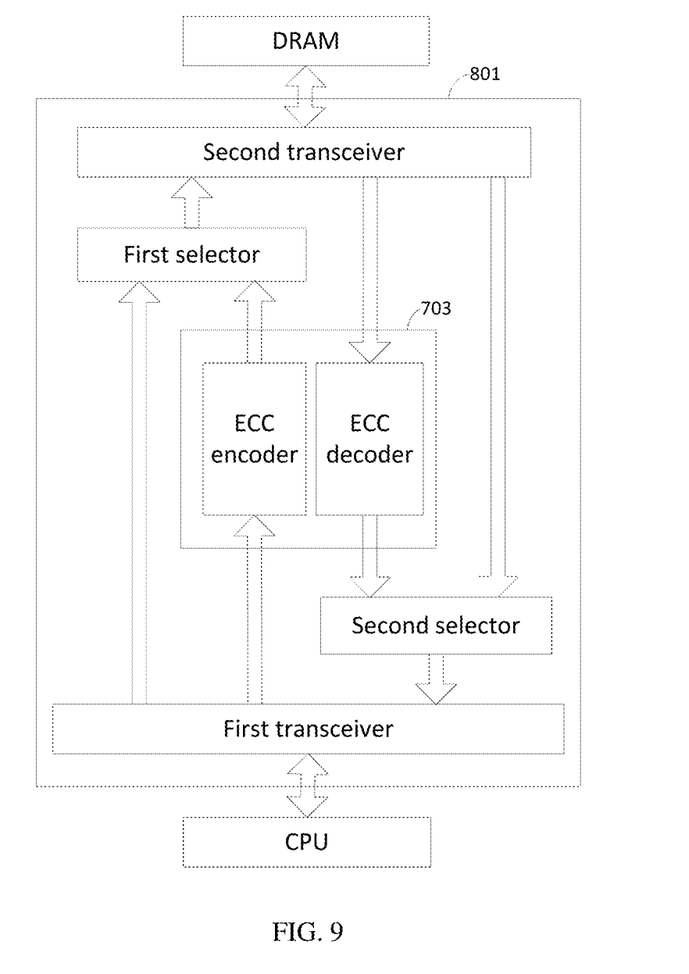
FIG. 9 is a schematic block diagram of a read operation and a write operation of a DDR DIMM, according to another embodiment of the disclosure.

FIG. 9 is a schematic block diagram of a read operation and a write operation of a DDR DIMM, according to another embodiment of the disclosure. As shown in FIG. 9, DBECC 801 includes a first transceiver, a second transceiver, ECC module 703, a first selector and a second selector. In a write operation, the first transceiver receivers all write data signals of a channel where it is located from a CPU at a rising edge of a system clock. When a control terminal of the first selector is set to enable an ECC function, the ECC encoder encodes write data of all the write data signals to generate a new ECC and send the new ECC and the write data to the second transceiver through the first selector, which are finally sent to the DRAM chips by the second transceiver. When the control terminal of the first selector is set to disable the ECC function, the first selector sends all the write data signals received by the first transceiver to the second transceiver, which are finally sent to the DRAM chips by the second transceiver. In this case, the system relies on a memory controller of the CPU for error correction.

In a read operation, the second transceiver receives all read data signals of the channel from the DRAM chips including read data and an ECC at a rising edge of a system clock. When a control terminal of the second selector is set to enable an ECC function, the ECC decoder detects whether there is an error bit in the read data of all the read data signals and sends the read data to the first transceiver through the second selector which is finally sent to the CPU by the first transceiver when no error bit exists therein or corrects the read data and sends the corrected read data to the first transceiver through the second selector which is finally sent to the CPU by the first transceiver when an error bit exists therein. When the control terminal of the second selector is set to disable the ECC function, the second transceiver sends all the read data signals received by the second transceiver to the first transceiver, which are finally sent to the CPU by the first transceiver. In this case, the system relies on the memory controller of the CPU for error correction.

In some embodiments, input signal of the control terminal of the first selector is the same as that of the control terminal of the second selector. In some embodiments, structure of the first transceiver is the same as that of the second transceiver.

Figure 10:
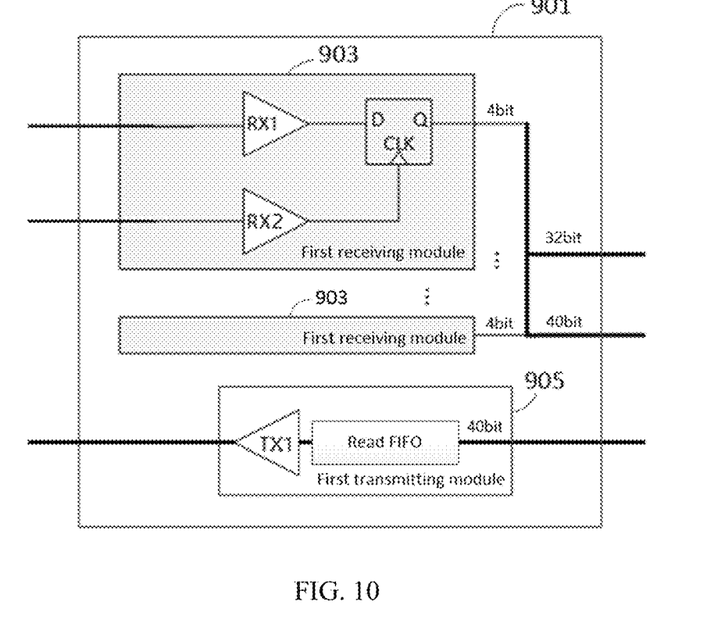
FIG. 10 is a structural block diagram of a first transceiver, according to an embodiment of the disclosure.

FIG. 10 is a structural block diagram of a first data transceiver, according to an embodiment of the disclosure. As shown in FIG. 10, first transceiver 901 includes a plurality of first receiving modules 903 and a first transmitting module 905. The plurality of first receiving modules 903 connect the CPU and are configured to obtain all write data signals of the channel from the CPU in a write operation and send the obtained write data signals to the first selector and the ECC encoder respectively. First transmitting module 905 connects the second selector and is configured to send an output of the second selector to the CPU.

Specifically, first receiving module 903 includes a first receiver (RX1), a second receiver (RX2) and a first D flip-flop. The first receiver is configured to receive a write data signal from the CPU and output the write data signal to a data-input terminal (D terminal) of the first D flip-flop, the second receiver is configured to receive a write sampling clock (DQS) from the CPU and output the write sampling clock to a clock-input terminal of the first D flip-flop. The write data signal from the CPU is output through a positive output terminal (Q terminal) of the first D flip-flop at a rising edge of the write sampling clock.

First transmitting module 905 includes a read FIFO module and a first transmitter (TX1). The read FIFO module is configured to receive an output from the second selector and send the output to the CPU through the first transmitter.

Figure 11:
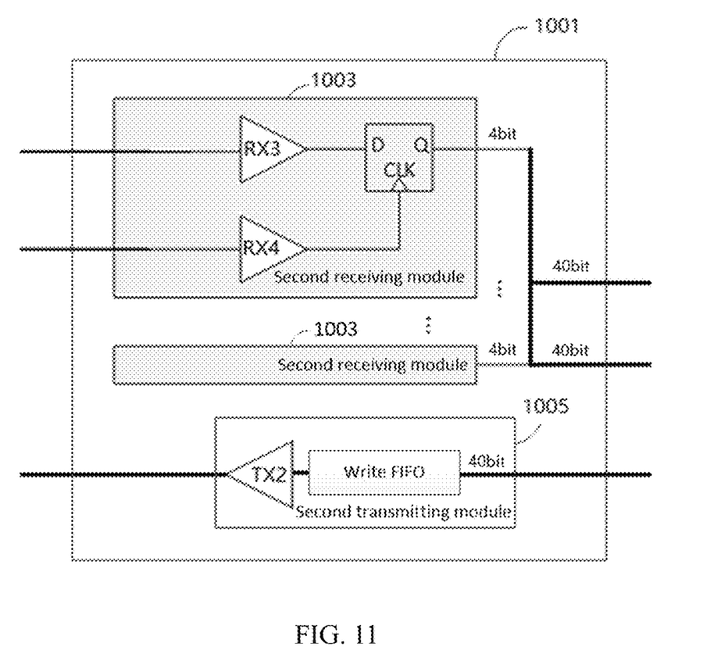
FIG. 11 is a structural block diagram of a second transceiver, according to an embodiment of the disclosure.

Similarly, as shown in FIG. 11, second transceiver 1001 includes a plurality of second receiving modules 1003 and a second transmitting module 1005. The plurality of second receiving modules 1003 connect the DRAM chips respectively and are configured to obtain all read data signals of the channel from the DRAM chips in a read operation and send the obtained read data signals to the second selector and the ECC decoder respectively. Second transmitting module 1005 connects the first selector and is configured to send an output from the first selector to the DRAM chips.

Specifically, second receiving module 1003 includes a third receiver (RX3), a fourth receiver (RX4) and a second D flip-flop. The third receiver is configured to receive a read data signal from the DRAM chips and output the read data signal to a data-input terminal (D terminal) of the second D flip-flop, the fourth receiver is configured to receive a read sampling clock (MDQS) and output the read sampling clock to a clock-input terminal of the second D flip-flop. The read data signal from the DRAM chips is output through a positive output terminal (Q terminal) of the second D flip-flop at a rising edge of the read sampling clock.

Second transmitting module 1005 includes a write FIFO module and a second transmitter (TX2). The write FIFO module is configured to receive an output of the first selector and send the output to the DRAM chips through the second transmitter.

Figure 12:
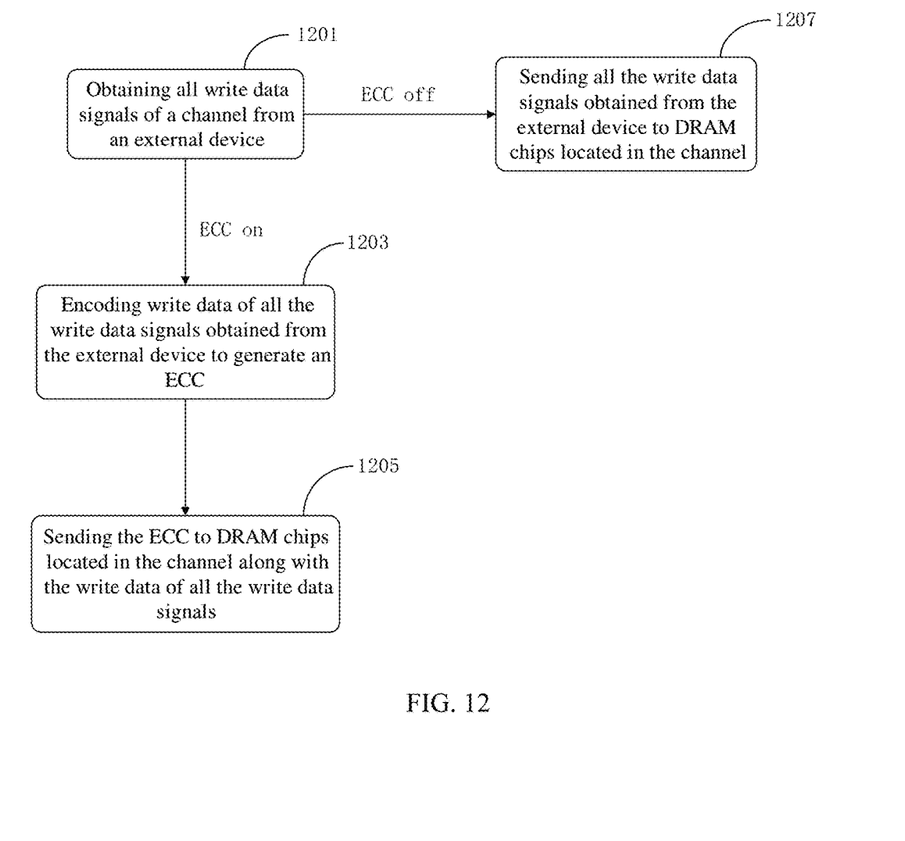
FIG. 12 is a flowchart of a write operation of a memory module, according to an embodiment of the disclosure.
Figure 13:
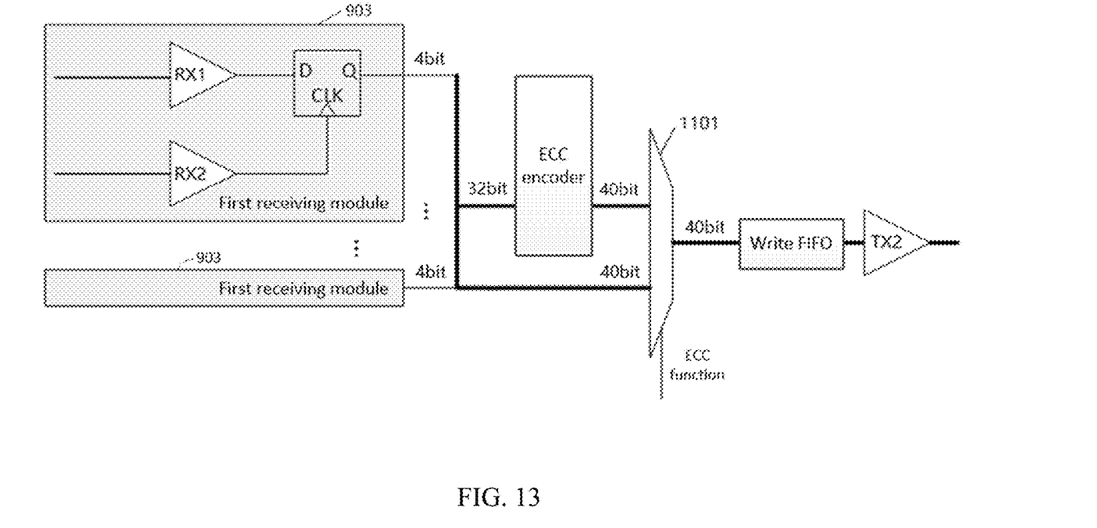
FIG. 13 is a schematic diagram of a structure corresponding to a write operation of a memory module, according to an embodiment of the disclosure.
Figure 14:
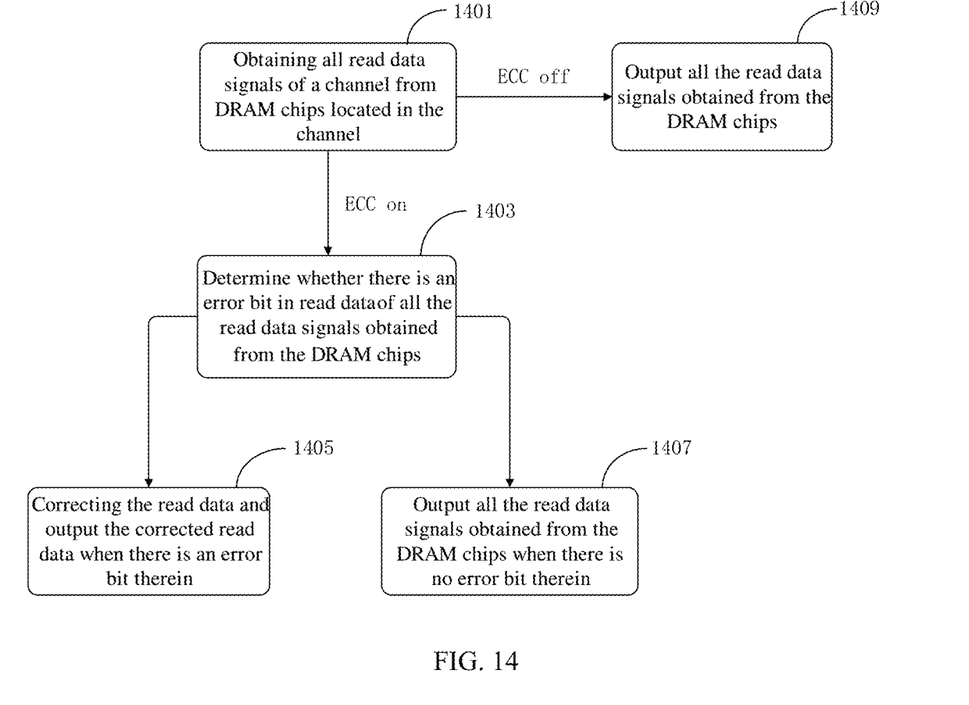
FIG. 14 is a flowchart of a read operation of a memory module, according to an embodiment of the disclosure.
Figure 15:
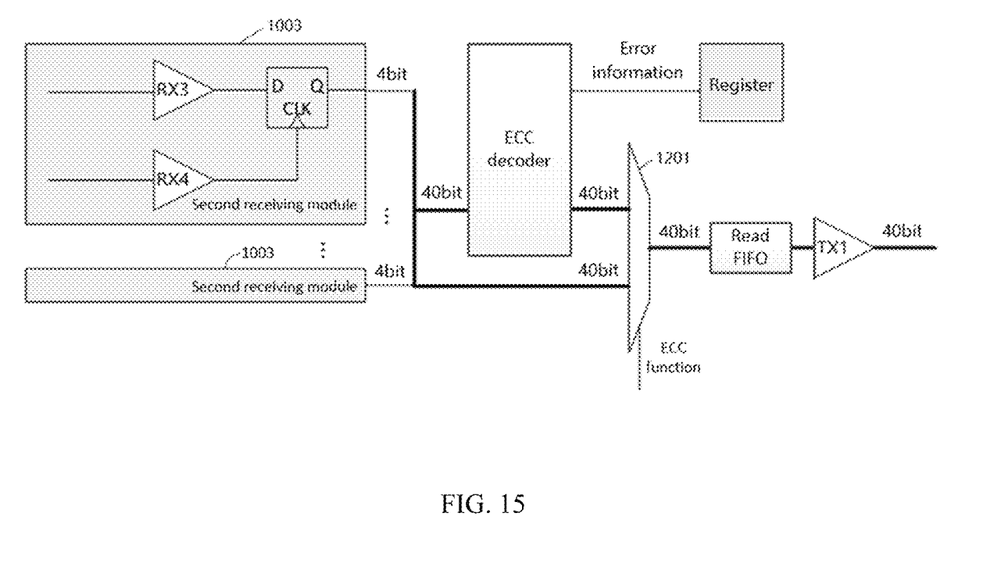
FIG. 15 is a schematic diagram of a structure corresponding to a read operation of a memory module, according to an embodiment of the disclosure.

FIG. 12 is a flowchart of a write operation of a memory module, according to an embodiment of the disclosure. FIG. 13 is a schematic diagram of a structure corresponding to a write operation of a memory module, according to an embodiment of the disclosure. FIG. 14 is a flowchart of a read operation of a memory module, according to an embodiment of the disclosure. FIG. 15 is a schematic diagram of a structure corresponding to a read operation of a memory module, according to an embodiment of the disclosure. Read and write operation of the memory module is illustrated in details below taking Rank0 of a channel with 10×4 DRAM chips for example according to an embodiment of the disclosure.

As shown in FIG. 12, according to an embodiment of the disclosure, a write operation of a DDR DIMM includes the following operations.

In operation 1201, all write data signals of a channel are obtained from an external device, for example a CPU.

As shown in FIG. 13, the plurality of first receiving modules 903 obtain all write data signals of a channel in which the plurality of first receiving modules 903 are located from a CPU at a rising edge of a DQ sampling clock (DQS). All the write data signals are 40 bits in total including 32-bit write data and an 8-bit ECC. Each first receiving module 903 obtains a 4-bit write data signal (also referred to a DQ Nibble), which is marked as Nibble0-9, wherein DQ is a data line connecting the CPU and a DBECC.

In operation 1203, write data of all the write data signals obtained from the external device is encoded to generate an ECC when an ECC function is enabled (ECC on).

As shown in FIG. 13, an ECC encoder of the DBECC encodes the 32-bit write data (formed by Nibble0-7 in some embodiments) to generate a new 8-bit ECC and output the new 8-bit ECC and the 32-bit write data when an ECC function of a first selector 1101 is enabled (default setting).

In operation 1205, the ECC is sent to DRAM chips located in the channel along with the write data of all the write data signals.

As shown in FIG. 13, first selector 1101 outputs the 32-bit data and the 8-bit ECC generated by the ECC encoder which are sent to DRAM chips via a write FIFO module and a second transmitter (TX2) afterwards. It should be understood that the DBECC can ignore the 8-bit ECC (e.g., Nibble8-9) from the CPU and use the 8-bit ECC generated by itself for subsequent transmission and verification when the ECC function is enabled.

In operation 1207, all the write data signals obtained from the external device are sent to DRAM chips located in the channel when an ECC function is disabled.

As shown in FIG. 13, the DBECC sends the 40-bit data signal (e.g., formed by Nibble0-9) from the CPU to the DRAM chips via the write FIFO module and the second transmitter when the ECC function of first selector 1101 is disabled. In this case, the system relies on a memory controller of the CPU for error correction.

As shown in FIG. 14, according to an embodiment of the disclosure, a read operation of a DDR DIMM includes the following operations.

In operation 1401, all read data signals of a channel are obtained from DRAM chips located in the channel.

As shown in FIG. 15, the plurality of second receiving modules 1003 obtain all read data signals of a channel from DRAM chips, where the plurality of second receiving modules 1003 and the DRAM chips are located at a rising edge of an MDQ sampling clock (MDQS). All the read data signals are 40 bits in total including 32-bit read data and an 8-bit ECC. Each second receiving module 1003 obtains a 4-bit read data signal (also referred to an MDQ Nibble) and there is a total of 10 Nibbles, wherein MDQ is a data line connecting a DBECC and the DRAM chips.

In operation 1403, all the read data signals obtained from the DRAM chips is checked to determine whether there is an error bit in read data thereof when an ECC function is enabled (ECC on).

As shown in FIG. 15, decoding is performed firstly by an ECC decoder of the DBECC to determine whether there is an error bit in the read data when an ECC function of a second selector 1201 is enabled (default setting).

In operation 1405, the read data is corrected and the corrected read data is sent out when there is an error bit therein.

As shown in FIG. 15, if there is an error bit in the read data of all the read data signals, the ECC decoder corrects the read data automatically. Second selector 1201 sends the corrected read data output by the ECC decoder to a CPU via a read FIFO module and a first transmitter (TX1). In this case, the DBECC stores error information in a local register for the CPU to read out and process afterwards.

In operation 1407, all the read data signals obtained from the DRAM chips are output when there is no error bit therein.

As shown in FIG. 15, all the read data signals obtained from the DRAM chips remain the same if there is no error bit therein. Second selector 1201 sends all the read data signals obtained from the DRAM chips and output by the ECC decoder to the CPU via the read FIFO module and the first transmitter.

In operation 1409, all the read data signals obtained from the DRAM chips are output when an ECC function is disabled (ECC off).

As shown in FIG. 15, second selector 1201 sends all the read data signals of the channel obtained from the DRAM chips by the plurality of second receiving modules to the CPU via the read FIFO module and the first transmitter when the ECC function of second selector 1201 is disabled. In this case, the system relies on a memory controller of the CPU for error correction.

According to embodiments of the disclosure, there are many options for error correction codes, such as Hamming codes, Reed Solomon ciphers, and other block codes or convolutional codes. Code length and specific mapping should be determined in terms of error attribute of memory chips.

In some embodiments, DRAM chips can be DDR4, DDR5, DDR6, LPDDR or GDDR, or can be LPDDR4, LPDDR5 or LPDDR5x, or other types of DRAM chips, which is not limited in the disclosure.

In description of the present disclosure, references to "one embodiment," "some embodiments," "an example," "a specific example," "some examples," etc., indicate that a particular feature, structure, material, or characteristic described in the embodiment or example can be included in at least one embodiment or example of the disclosure. Moreover, the particular feature, structure, material, or characteristic described can be combined in any one or more embodiments or examples in a reasonable way. Besides, it would be within the knowledge of a person skilled in the pertinent art to affect such feature, structure, material, or characteristic in connection with other embodiments or examples without contradiction.

Moreover, terms such as "first" and "second" are just for illustration which should not be interpreted as indicating or implying relative importance, or implying number of the indicated feature. Thus, a feature described by "first" or "second" can include at least one of the feature explicitly or implicitly. In description of the present disclosure, "multiple" means two or more, unless otherwise specified.

Any process or method described in a flowchart or otherwise herein can be interpreted as including one or more (two or more than two) modules, fragments or sections of executable code to implement steps of a specified logical function or process. Also, the scope of preferred embodiments of the disclosure includes alternative implementations wherein the function can be performed out of the order shown or discussed, including performing the function in a substantially simultaneous way or in a reverse order.

The logic and/or steps described in a flowchart or otherwise herein, for example, can be a list of executable code to implement a logic function, which can be embodied in any computer-readable medium and can be used by or in combination with an instruction execution system, apparatus or device (e.g., a computer-based system, a system including a processor, or other systems capable of reading and executing instructions from an instruction execution system, apparatus or device).

It should be understood that various parts of the present disclosure can be implemented by hardware, software, firmware, or a combination thereof. In the foregoing embodiments, various steps or methods can be implemented by software or firmware stored in a memory and executed by a suitable instruction execution system. All or part of the steps of the methods in the foregoing embodiments can be implemented by controlling relevant hardware through a program, which can be stored in a computer-readable storage medium and can implement one or a combination of the steps of the method of the embodiment when executed.

In addition, all the function unit in each embodiment of the disclosure can either be integrated in one processing module, or be separate units, or two or more of the function units are integrated in one module. The integrated module can be implemented by hardware or by function modules of software. Being implemented in the form of software function modules and being sold or used as a separate product, the integrated module mentioned above can also be stored in a computer-readable storage medium, which could be a read-only memory, a magnetic disk, an optical disk, and the like.

The foregoing description covers only embodiments of the disclosure, it should be understood that the scope of the disclosure is not limited thereto. A person skilled in the pertinent art will recognize that various variations and alternatives can be used without departing from the spirit and scope of the present disclosure. Therefore, scope of the present disclosure is subject to scope of the claims.

What is claimed is:

1. A DDR DIMM, comprising:
a first channel comprising a first group of DRAM chips and a first data buffer corresponding to the first group of DRAM chips; wherein:
the first data buffer is configured to obtain all write data signals input to the first channel, encode write data of all the write data signals to generate a new ECC, and send the new ECC and the write data to the first group of DRAM chips in a write operation; and
the new ECC is generated by the first data buffer.

2. The DDR DIMM of claim 1, wherein:
the first data buffer is further configured to obtain all read data signals of the first channel from the first group of DRAM chips, check whether there is an error bit in read data of all the read data signals, and correct the read data and send out the corrected read data when there is an error bit therein in a read operation.

3. The DDR DIMM of claim 1, further comprising:
a circuit board; wherein:
the first channel further comprises a second group of DRAM chips;
the first group of DRAM chips are located on a first side of the circuit board, and the second group of DRAM chips are located on a second side of the circuit board opposite to the first side;
the first data buffer corresponds to the second group of DRAM chips; and
the first group of DRAM chips and the second group of DRAM chips cannot work simultaneously.

4. The DDR DIMM of claim 3, wherein:
the first data buffer is further configured to send the new ECC and the write data to the second group of DRAM chips in a write operation; and obtain all read data signals of the first channel from the second group of DRAM chips, check whether there is an error bit in read data of all the read data signals, and correct the read data and send out the corrected read data when there is an error bit therein in a read operation.

5. The DDR DIMM of claim 1, wherein:
the first data buffer comprises a first transceiver, a second transceiver, an ECC encoder and an ECC decoder;
the ECC encoder and the ECC decoder connect the first transceiver and the second transceiver respectively; and
the second transceiver connects the first group of DRAM chips.

6. The DDR DIMM of claim 5, wherein:
in the write operation, the first transceiver is configured to receive all the write data signals input to the first channel triggered by a clock signal, the ECC encoder is configured to encode the write data of all the write data signals to generate the new ECC, and the second transceiver is configured to send the new ECC and the write data to the first group of DRAM chips.

7. The DDR DIMM of claim 5, wherein:
in a read operation, the second transceiver is configured to obtain all read data signals of the first channel from the first group of DRAM chips triggered by a clock signal, the ECC decoder is configured to check whether there is an error bit in read data of all the read data signals, and correct the read data and output the corrected read data when there is an error bit therein, or output the read data when there is no error bit therein, and the first transceiver is configured to send out the corrected read data or the read data output by the ECC decoder.

8. The DDR DIMM of claim 5, wherein:
the first transceiver comprises a plurality of first receiving modules; and
the plurality of first receiving modules are configured to obtain all the write data signals input to the first channel in the write operation.

9. The DDR DIMM of claim 8, wherein:
the first receiving module comprises a first receiver, a second receiver and a first D flip-flop;
the first receiver is configured to receive a write data signal input to the first channel and output the write data signal to a data-input terminal of the first D flip-flop;
the second receiver is configured to receive a write sampling clock and output the write sampling clock to a clock-input terminal of the first D flip-flop; and
the first D flip-flop is configured to output the write data signal input to the first channel at a rising edge of the write sampling clock through a positive output terminal thereof.

10. The DDR DIMM of claim 5, wherein:
the second transceiver comprises a plurality of second receiving modules; and
the plurality of second receiving modules are configured to obtain all read data signals of the first channel from the first group of DRAM chips and output all the read data signals in a read operation.

11. The DDR DIMM of claim 10, wherein:
the second receiving module comprises a third receiver, a fourth receiver and a second D flip-flop;
the third receiver is configured to receive a read data signal from the first group of DRAM chips and output the read data signal to a data-input terminal of the second D flip-flop;
the fourth receiver is configured to receive a read sampling clock and output the read sampling clock to a clock-input terminal of the second D flip-flop; and
the second D flip-flop is configured to output the read data signal from the first group of DRAM chips at a rising edge of the read sampling clock through a positive output terminal thereof.

12. A memory system, comprising:
a CPU; and
a DDR DIMM comprising a first channel; wherein:
the first channel comprises a first group of DRAM chips and a first data buffer corresponding to the first group of DRAM chips;
the first data buffer is configured to send write data of all write data signals sent to the first channel by the CPU to the first group of DRAM chips in a first write operation, and obtain all read data signals of the first channel from the first group of DRAM chips in a first read operation; and the first data buffer is further operable for error correction to generate a new ECC in the first write operation and the first read operation.

13. The memory system of claim 12, wherein:

the first data buffer is configured to obtain all the write data signals sent to the first channel by the CPU, encode the write data of all the write data signals to generate a first ECC, and send the first ECC and the write data to the first group of DRAM chips in the first write operation.

14. The memory system of claim 12, wherein:

the first data buffer is further configured to obtain all read data signals of the first channel from the first group of DRAM chips, check whether there is an error bit in read data of all the read data signals, and correct the read data and send the corrected read data to the CPU when there is an error bit therein in the first read operation.

15. The memory system of claim 12, further comprising:

a circuit board; wherein:

the first channel further comprises a second group of DRAM chips;

the first group of DRAM chips are located on a first side of the circuit board, and the second group of DRAM chips are located on a second side of the circuit board opposite to the first side;

the first data buffer corresponds to the second group of DRAM chips; and the first group of DRAM chips and the second group of DRAM chips cannot work simultaneously.

16. The memory system of claim 15, wherein:

the first data buffer is further configured to obtain all the write data signals sent to the first channel by the CPU, encode the write data of all the write data signals to generate a first ECC, send the first ECC and the write data to the second group of DRAM chips in the first write operation; and the first data buffer is further configured to obtain all read data signals of the first channel from the second group of DRAM chips, check whether there is an error bit in read data of all the read data signals, and correct the read data and send the corrected read data to the CPU when there is an error bit therein in the first read operation.

17. The memory system of claim 12, further comprising:

a second channel comprising a third group of DRAM chips and a second data buffer corresponding to the third group of DRAM chips; wherein:

the second data buffer is configured to send write data of all write data signals sent to the second channel by the CPU to the third group of DRAM chips in a second write operation, and obtain all read data signals of the second channel from the third group of DRAM chips in a second read operation; and the second data buffer is further operable for error correction in the second write operation and the second read operation.

18. The memory system of claim 17, wherein:

the second data buffer is configured to obtain all the write data signals sent to the second channel by the CPU, encode the write data of all the write data signals of the second channel to generate a second ECC, and send the second ECC and the write data of all the write data signals of the second channel to the third group of DRAM chips in the second write operation; and the second data buffer is further configured to obtain all the read data signals of the second channel from the third group of DRAM chips, check whether there is an error bit in read data of all the read data signals of the second channel, and correct the read data and send the corrected read data to the CPU when there is an error bit therein in the second read operation.

19. A method of operating a DDR DIMM, comprising:

obtaining all write data signals of a channel from an external device by a data buffer;

encoding write data of all the write data signals obtained from the external device to generate an ECC by the data buffer; and sending the ECC and the write data of all the write data signals to DRAM chips of the channel.

20. The method of claim 19, further comprising:

obtaining all read data signals of the channel from the DRAM chips;

checking whether there is an error bit in read data of all the read data signals obtained from the DRAM chips; and correcting the read data and send out the corrected read data when there is an error bit therein.

* * * * *